No. 661,863. Patented Nov. 13, 1900.
J. S. GODFREY.
ROLLER BEARING.
(Application filed Sept. 4, 1900.)
(No Model.)
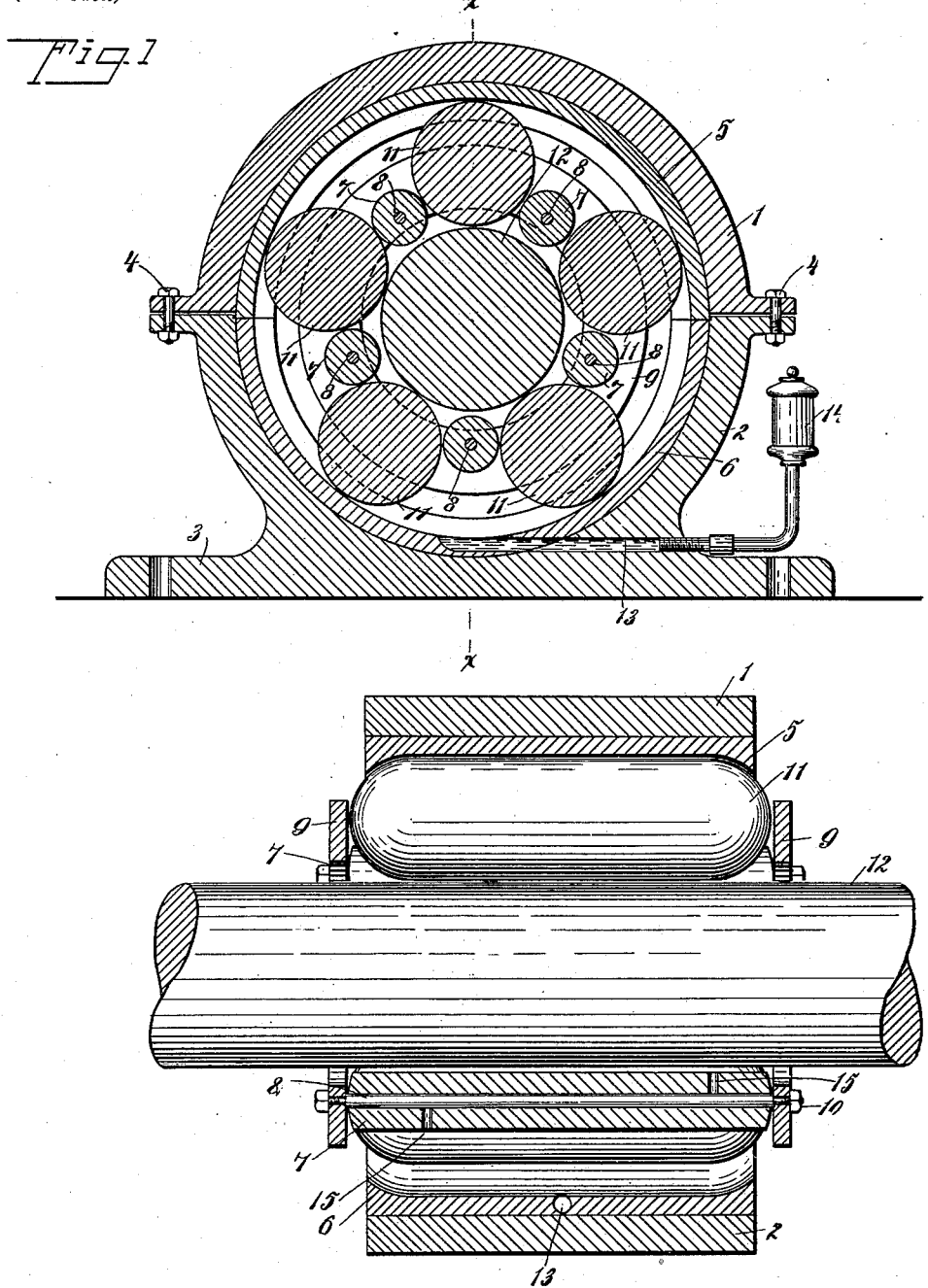
WITNESSES:
INVENTOR
John S. Godfrey.
BY
ATTORNEYS

UNITED STATES PATENT OFFICE.

JOHN S. GODFREY, OF HARRINGTON, WASHINGTON, ASSIGNOR OF ONE-HALF TO JOHN E. CROSBY, OF SAME PLACE.

ROLLER-BEARING.

SPECIFICATION forming part of Letters Patent No. 661,863, dated November 13, 1900.

Application filed September 4, 1900. Serial No. 28,980. (No model.)

*To all whom it may concern:*

Be it known that I, JOHN S. GODFREY, a citizen of the United States, and a resident of Harrington, in the county of Lincoln and State of Washington, have invented a new and Improved Roller-Bearing, of which the following is a full, clear, and exact description.

This invention relates to improvements in roller-bearings for shafts, journals, or the like; and the object is to provide a roller-bearing of simple construction that will be strong and serviceable and in which friction is reduced to a minimum.

I will describe a roller-bearing embodying my invention and then point out the novel features in the appended claims.

Reference is to be had to the accompanying drawings, forming a part of this specification, in which similar characters of reference indicate corresponding parts in both views.

Figure 1 is a transverse section of a roller-bearing embodying my invention, and Fig. 2 is a section on the line $x\ x$ of Fig. 1.

The casing for the bearing consists of an upper section 1 and a lower section 2, which is here shown as supported on a base 3. The two sections 1 and 2 are provided with outwardly-extended flanges through which fastening-bolts 4 pass. Within the casing is a steel lining, also consisting of two sections 5 6, the ends at the inner side of the lining being curved inward. A series of guide-rollers 7 are mounted to rotate on rods 8, which extend through the casing and have their ends attached to rings 9. The ends of the rods 8 are provided with shoulders which abut against the inner sides of the rings 9, and nuts 10 are engaged with the outer or projected ends of said rods. It is to be understood, however, that the outer ends may be riveted, if desired. By providing the shoulders on the rods, which abut against the inner sides of the rings, the cage or holder for the rollers 7 is prevented from rocking or twisting movement that would cause the ends of the rollers to bear tightly against the rings. It will be noted that the ends of the rollers 7 are rounded, so that they have very little bearing on the rings. Vertical rollers 11 are supported by the rollers 7, as plainly indicated in the drawings, and then engage against the steel lining of the casing. The ends of these rollers 11 are rounded or made semicylindrical, thus causing very little if any friction at the end portions engaging with the curved portions of the lining. These several rollers 11 form a bearing for the shaft or spindle 12.

An oil-port 13 communicates with the interior of the casing at the bottom, and oil may be supplied thereto from a cup 14. The oil passing into the lower portion of the casing will be taken up by the friction-rollers as they rotate and will be carried to the top and circulate downward, and a portion of the oil will pass through ports 15, formed in the guide-rollers 7, to the rods 8, thus lubricating the bearing for the roller.

Having thus described my invention, I claim as new and desire to secure by Letters Patent—

1. A roller-bearing, comprising a casing having the ends of its inner wall curved inward, a cage, guide-rollers supported by said cage and extended through the casing, the ends of said guide-rollers being rounded, and antifriction-rollers supported by the guide-rollers and having rounded ends, substantially as specified.

2. A roller-bearing, comprising a casing, a hard-metal lining therefor having its ends curved inward, a cage, comprising rings adapted to surround a shaft or spindle, rods connecting the rings, the said rods being provided with shoulders to bear against the inner surfaces of the rings, guide-rollers mounted to rotate on the said rods and provided with oil-ports, means for supplying oil to the interior of the casing, and friction-rollers supported by the guide-rollers and having rounded ends, substantially as specified.

In testimony whereof I have signed my name to this specification in the presence of two subscribing witnesses.

JOHN S. GODFREY.

Witnesses:
 H. DYKE,
 E. D. COLESON.